July 24, 1934. V. A. SCHOENBERG Re. 19,255
METHOD OF TESTING OIL
Original Filed July 24, 1933
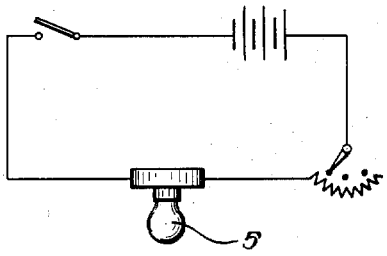
Fig. 1
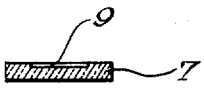
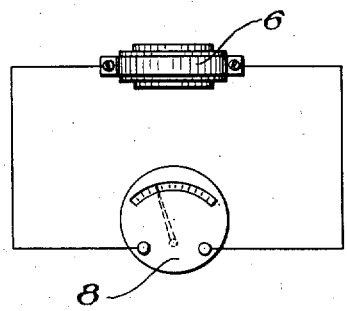
Fig. 2
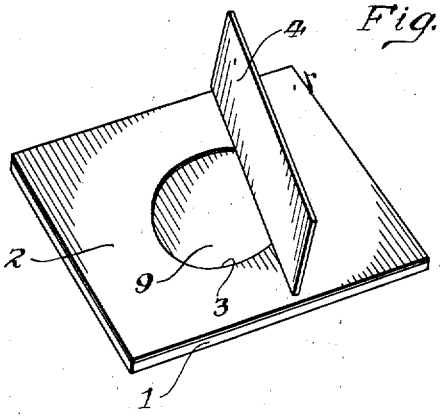
Fig. 3
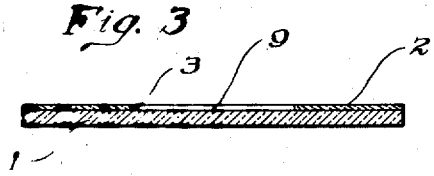
Inventor
Virgil A. Schoenberg
by Rummler, Rummler & Woodworth
his Attys.

Reissued July 24, 1934 Re. 19,255

UNITED STATES PATENT OFFICE 19,255

METHOD OF TESTING OIL

Virgil A. Schoenberg, Niles Center, Ill., assignor to Light Research Corporation, Niles Center, Ill., a corporation of Illinois Original No. 1,940,373, dated December 19, 1933, Serial No. 681,958, July 24, 1933. Application for reissue May 23, 1934, Serial No. 727,203

4 Claims. (Cl. 88—14)

This invention relates to an improved method for preparing samples of liquid for testing purposes.

The main objects of this invention are to provide an improved method for determining the degree of contamination of a liquid by means of light passing therethrough; to provide an improved method of preparing a sample of the liquid to be tested; to provide a simplified means for forming a film of predetermined depth of the liquid to be tested; and to provide an improved liquid testing slide that can be rapidly and readily manipulated with a high degree of accuracy.

A specific embodiment of this invention is shown in the accompanying drawing in which:

Figure 1 is a diagrammatic lay-out comprising the three principal elements of a liquid testing apparatus.

Fig. 2 is a perspective view of a testing slide showing a straightedge as used in wiping the same to form a film of liquid.

Fig. 3 is a sectional view taken through the center of the testing slide and illustrating a preferred construction of the same.

In the form shown in the drawing my improved liquid testing device comprises a slide formed of rectangular base plate 1 having secured on one face thereof a cover sheet 2 of predetermined thickness and having a centrally disposed aperture 3; and a straightedge wiper 4 of suitable size to wipe substantially the entire surface of the slide.

The base plate 1 may be made of any suitable material that is pervious to light, but is preferably made from glass. The cover sheet 2 may be made of any suitable, preferably opaque, material of uniform predetermined thickness that will provide a plane outer surface, and the straightedge may be made of any substantially rigid material suitable to be provided with and retain a straight angular edge.

The aperture 3 in the cover plate 2 provides a recessed or countersunk portion in the testing slide in which the sample of the liquid to be tested is placed, and, because of the preferably opaque nature of the cover plate 2, light passing through the slide is confined to the countersunk portion. It is understood that the slide may be made from a single piece of material into which the countersunk portion is cut or ground. In such cases the body of the slide in which the countersunk portion is formed is made opaque and only the countersunk portion of the slide is made so as to be pervious to light.

The art of determining the density and the contaminating content of fluids by means of light sensitive apparatus is well known, and the usual method is to interpose a sample of the fluid to be tested between a light source of known intensity and a light sensitive device such as a photronic cell or a photoelectric cell, whereby a meter is caused to indicate the relative amount of light penetrating the fluid being tested, the amount of penetrating light having a definite relation to the contaminating content of the fluid. In such apparatus the fluid is usually caused to flow through a channel arranged between the light source and the light sensitive apparatus. However, such apparatus is bulky and intricate and requires a relatively large quantity of the fluid to be tested in order to obtain satisfactory results.

In the use of my invention the apparatus shown is arranged in a vertical plane as illustrated in Fig. 1, the light source 5 being positioned above and the light sensitive device 6 being positioned below the testing slide which is in Fig. 1 designated by the numeral 7. This apparatus can be arranged in a convenient compact form and provided with suitable means not shown, upon or into which the slide 7 is placed when a test is to be made. The meter 8 which indicates the relative amount of light passing through the sample being tested is actuated by the light sensitive device 6 and is positioned in any suitable location where it can be conveniently observed by the operator.

The calibration of the meter or indicator 8 is preferably in terms that directly indicate the relative amount of contaminating substance in the sample so that the operator can make an instant determination of the condition of the liquid under test without having to refer to a conversion chart or table. For example, the calibration for a liquid used in a certain process or operation would be in terms directly indicating the condition or suitability of that liquid for continued use in that operation or process.

The operation of the apparatus shown consists in placing a quantity of the fluid to be tested in the counter-sunk portion of the test slide which is formed by the aperture 3 in the cover sheet 2 and then wiping the surface of the cover sheet with the straightedge so as to remove any excess liquid therefrom and form a plane surface on the liquid in the counter-sunk portion 9. The slide is then inserted into the testing apparatus in a level horizontal position, and the action of gravity is relied upon to maintain the liquid sample in a proper condition on the slide.

In testing the density or the relative amount of contaminating matter in a liquid, it is essential that the test sample be of a definite, predetermined depth or thickness, since the intensity of the light source and the calibration of the meter are arranged to indicate a certain definite amount of light passing through a proof or basic sample of the liquid being tested, and the change of density or degree of contamination of other samples of liquid are indicated by a deviation on the meter from the normal or basic reading.

In testing liquids it is preferable to have the test sample in the form of a film, in order that the intensity of the light source need not be so great. However, in apparatus now in use it is difficult to obtain a sample film of a predetermined thickness without a complicated and costly arrangement of glass plates or the like between which a stream of liquid of predetermined depth is forced. With my improved device a small sample of the liquid to be tested is readily spread into a film of the desired predetermined thickness through the action of the straightedge as it wipes across the plane surface of the test plate and wipes or planes off the excess liquid, the thickness of the film being determined by the thickness of the cover sheet 2, which is preferably cemented onto the base plate 1. With such a device the thickness of the test samples or films is always constant and the results of the test are exceedingly accurate. The quantity of liquid placed on the slide is always greater than is necessary to form the film and the excess liquid is removed by the wiper.

The principal advantages of my invention reside in the simplicity of the apparatus involved and the rapidity with which a small sample of the liquid to be tested can be prepared for testing. For example, in the testing of oil in the crank case of a motor, it is only necessary to obtain a few drops of the oil, drop them into the counter-sunk portion of the test plate, wipe away the surplus oil and form a plane surface on the liquid in the counter-sunk portion by means of the straightedge, and then insert the slide into the testing apparatus, after which a reading on the meter can be instantly obtained. With the previous testing equipments it was necessary to use a large sample of the liquid to be tested in order that the same could be caused to flow in a stream through the testing apparatus and reliable results obtained.

Although but one specific embodiment of this invention has been herein shown and described, it will be understood that details of the construction shown may be altered or omitted without departing from the spirit of this invention as defined by the following claims.

I claim:

1. The method of testing oils which consists in forming a film of oil of predetermined thickness on a transparent slide by overfilling a depression of uniform depth in the surface of said slide with the oil to be tested and wiping the surface of said slide with a straightedge to remove the excess oil above the plane of the surface of said slide and provide a plane surface on the oil in said depression, placing said slide in a horizontal position between a light source and a light sensitive device, and measuring the light passing through the oil film.

2. The method of testing liquids which consists in forming a film of the liquid of predetermined thickness on a transparent slide by over filling a depression of uniform depth in the surface of said slide with the liquid to be tested and wiping the surface of said slide with a straight edge to remove the excess liquid above the plane of the surface of said slide and provide a plane surface on the liquid in said depression, placing said slide in a horizontal position directly between a light source and a light receptive device, and measuring the emergent light.

3. The method of testing oils which consists in forming a film of oil of predetermined thickness on a transparent slide by overfilling a depression of uniform depth in the surface of said slide with the oil to be tested and wiping the surface of said slide with a straightedge to remove the excess oil above the plane of the surface of said slide and provide a plane surface on the oil in said depression, placing said slide between a light source and a light sensitive device, and measuring the light passing through the oil film.

4. The method of testing liquids which consists in forming a film of the liquid of predetermined thickness on a transparent slide by overfilling a depression of uniform depth in the surface of said slide with the liquid to be tested and wiping the surface of said slide with a straightedge to remove the excess liquid above the plane of the surface of said slide and provide a plane surface on the liquid in said depression, placing said slide directly between a light source and a light receptive device, and measuring the emergent light.

VIRGIL A. SCHOENBERG.